US011747032B2

(12) United States Patent
 Su (10) Patent No.: US 11,747,032 B2
(45) Date of Patent: Sep. 5, 2023

(54) AIR FILTER ESSENTIALLY FOR USE IN WOODWORKING WORKPLACE

(71) Applicant: YEN SHEN ELECTRIC IND. CO., LTD., Taichung (TW)

(72) Inventor: Sam Su, Taichung (TW)

(73) Assignee: JPW INDUSTRIES INC., Lavergne, TN (US)

( * ) Notice: Subject to any disclaimer, the term of this patent is extended or adjusted under 35 U.S.C. 154(b) by 353 days.

(21) Appl. No.: 17/329,179

(22) Filed: May 25, 2021

(65) Prior Publication Data
 US 2022/0349596 A1 Nov. 3, 2022

(30) Foreign Application Priority Data
 Apr. 28, 2021 (TW) ................................ 110115389

(51) Int. Cl.
 *B01D 46/00* (2022.01)
 *B01D 46/10* (2006.01)
 *B01D 46/42* (2006.01)
 *B01D 46/48* (2006.01)
 *F24F 8/108* (2021.01)
 *F24F 13/20* (2006.01)
 *F24F 13/28* (2006.01)
 *B01D 46/52* (2006.01)

(52) U.S. Cl.
 CPC .......... *F24F 8/108* (2021.01); *B01D 46/0005* (2013.01); *B01D 46/521* (2013.01); *F24F 13/20* (2013.01); *F24F 13/28* (2013.01); *B01D 2273/30* (2013.01); *F24F 2013/205* (2013.01)

(58) Field of Classification Search
 CPC ............ B01D 46/0023; B01D 46/0028; B01D 46/10; B01D 2275/305; B01D 46/0005; B01D 46/0045; B01D 46/48; B01D 46/4236; B01D 46/521; B01D 2273/30; F24F 8/108; F24F 13/20; F24F 13/28; F24F 2013/205
 USPC ....... 55/385.1, 470–473, 385.2, 418; 96/139; 454/184, 187, 192
 See application file for complete search history.

(56) References Cited

U.S. PATENT DOCUMENTS

| | | | |
|---|---|---|---|
| 6,344,065 B1 * | 2/2002 | Boulva | B01D 46/543 |
| | | | 55/385.2 |
| 7,074,250 B1 * | 7/2006 | Chipner | B01D 46/0005 |
| | | | 95/286 |

(Continued)

FOREIGN PATENT DOCUMENTS

TW M500869 U 5/2015

*Primary Examiner* — Minh Chau T Pham
(74) *Attorney, Agent, or Firm* — Bradley Arant Boult Cummings LLP; Blake M. Bernard (57) ABSTRACT

An air filter essentially for use in woodworking workplaces includes a casing having a top panel, a bottom panel, two sidewalls, a filter gauze, a motor, and whizzer blades. The casing has an inlet anteriorly and an outlet. The casing has therein an inner blocking wall which extends rearward to form two inner sidewalls. The two inner sidewalls are each penetrated by a through hole. The two through holes face each other. The casing further has a curved panel bending in its thickness direction. The curved panel and the two inner sidewalls together define a receiving space. The curved panel curves to an extent corresponding in curvature to part of the outer edges of the whizzer blades and is spaced apart from the whizzer blades by a predetermined distance.

9 Claims, 8 Drawing Sheets

(56) References Cited

U.S. PATENT DOCUMENTS

| | | | | |
|---|---|---|---|---|
| 8,419,845 B2* | 4/2013 | Lin | ............... | F24F 1/0071 |
| | | | | 55/467 |
| 9,700,822 B2* | 7/2017 | Horng | ............... | B01D 46/62 |
| 10,054,321 B2* | 8/2018 | Carbone | ............... | B60H 1/3232 |
| 10,823,433 B2* | 11/2020 | Cho | ............... | F24F 1/0014 |
| 2009/0031684 A1* | 2/2009 | Ragona | ............... | B01D 46/46 |
| | | | | 55/383 |
| 2016/0016103 A1 | 1/2016 | Raether | | |
| 2019/0200829 A1* | 7/2019 | Conrad | ............... | A47L 9/1608 |

* cited by examiner

AIR FILTER ESSENTIALLY FOR USE IN WOODWORKING WORKPLACE

BACKGROUND OF THE INVENTION

1. Field of the Invention

The present disclosure relates to air filtration technology and, more particularly, to an air filter essentially for use in woodworking workplaces.

2. Description of the Related Art

Air filters essentially for use in woodworking workplaces are not unknown. For instance, US 2016/0016103A1 discloses an air filtration system for filtering air and essentially discloses where and how to mount an internal filter gauze in place. Taiwan patent M500869 discloses an air filtration device and essentially discloses the structure of an internal filter gauze.

The prior art does not disclose the technology of mounting a filter gauze, a driving motor and vanes inside a casing but discloses mounting a filter gauze inside a casing and then connecting an air extracting device to the casing to enable air extraction. However, nowadays it is desirable for air filters essentially for use in woodworking workplaces to be compact, durable and easy to produce. Therefore, the technology of mounting both a driving motor and a filter gauze inside a casing to form a self-contained air filtration device is in demand. However, the technology of mounting a driving motor, vanes and a filter gauze inside a casing is not unique but requires giving considerations to factors, such as where and how to mount a filter gauze in place, spatial relationship of a driving motor and vanes inside the casing, and structural simplicity.

BRIEF SUMMARY OF THE INVENTION

It is an objective of the present disclosure to provide an air filter essentially for use in woodworking workplaces, characterized in that a motor, whizzer blades and a filter gauze are coupled together and disposed in a casing. Therefore, compared with its conventional counterparts, the air filter of the present disclosure is advantageously compact, structurally simple and easy to produce.

In order to achieve the above and other objectives, the present disclosure provides an air filter essentially for use in woodworking workplaces, comprising a casing having a top panel, a bottom panel and two sidewalls. The casing has an inlet anteriorly and an outlet. The casing has therein an inner blocking wall seamlessly connected to the top panel and the bottom panel. The left and right edges of the inner blocking wall extend rearward to form two inner sidewalls, respectively. The two inner sidewalls are seamlessly connected to the top panel and the bottom panel. The rear ends of the two inner sidewalls are seamlessly connected to the two sidewalls. The two inner sidewalls are each penetrated by a through hole. The two through holes face each other and are in communication with the inlet. The casing further has a curved panel which bends in its thickness direction. Two edges of the curved panel are seamlessly connected to the two inner sidewalls. The curved panel and the two inner sidewalls together define a receiving space. The receiving space is in communication with the outlet. The inner blocking wall is spaced apart from the inlet by a predetermined distance. The left and right edges of the two inner blocking walls are spaced apart from the two sidewalls by a predetermined distance. The air filter further comprises: a filter gauze disposed at the casing and covering the inlet; a motor fixedly disposed at the casing and disposed in the receiving space; and a plurality of whizzer blades disposed at the motor and in the receiving space. The curved panel curves to an extent corresponding in curvature to part of the outer edges of the whizzer blades and is spaced apart from the whizzer blades by a predetermined distance. The whizzer blades axially face the through holes of the two inner sidewalls and are driven by the motor to rotate and draw in air via the through holes of the two inner sidewalls and discharge air via the outlet.

Therefore, according to the present disclosure, a motor, a plurality of whizzer blades and a filter gauze are coupled together and disposed in a casing. Therefore, compared with its conventional counterparts, the air filter of the present disclosure is advantageously compact, structurally simple and easy to produce. Furthermore, the curved panel and the whizzer blades of the present disclosure and their arrangement maximize the amount of air discharged per unit time and thus discharge air and thereby perform air filtration more efficiently than their conventional counterparts.

DETAILED DESCRIPTION OF THE INVENTION

Technical features of the present disclosure are hereunder illustrated with preferred embodiments, depicted with drawings, and described below.

Referring to FIG. 1 through FIG. 7, a preferred embodiment of the present disclosure provides an air filter 10 essentially for use in woodworking workplaces. The air filter 10 essentially comprises a casing 11, a filter gauze 21, a motor 31 and a plurality of whizzer blades 41.

The casing 11 has a top panel 12, a bottom panel 13 and two sidewalls 14. The casing 11 has an inlet 15 anteriorly and has an outlet 16 posteriorly. The casing 11 has therein an inner blocking wall 17 seamlessly connected to the top panel 12 and the bottom panel 13. The left and right edges of the inner blocking wall 17 extend rearward to form two inner sidewalls 18, respectively. The two inner sidewalls 18 are seamlessly connected to the top panel 12 the bottom panel 13, respectively. The rear edges of the two inner sidewalls 18 are seamlessly connected to the two sidewalls 14, respectively. The two inner sidewalls 18 are each penetrated by a through hole 181. The two through holes 181 face each other and are in communication with the inlet 15. The casing 11 further has a curved panel 19 which bends in its thickness dimension. Two edges of the curved panel 19 are seamlessly connected to the two inner sidewalls 18; hence, the curved panel 19 and the two inner sidewalls 18 together define a receiving space 182. The receiving space 182 is in communication with the outlet 16. The inner blocking wall 17 is spaced apart from the inlet 15 by a predetermined distance. The left and right edges of the inner blocking wall 17 are spaced apart from the two sidewalls 14 by a predetermined distance. Furthermore, in this embodiment, the curved panel 19 is also spaced apart from the inner blocking wall 17 by a predetermined distance. Alternatively, depending on the shape of the casing 11, the outlet 16 may not be posteriorly disposed at the casing 11. For instance, the outlet 16 may be disposed at a rear-right point, a rear-left point or a lateral edge of the casing 11, and in consequence the locations of the receiving space 182 and the two inner sidewalls 18 must also be adjusted. Persons skilled in the art are able to decide on the way of carrying out the adjustment by referring to the aforesaid structures. Therefore, the adjustment is, for the sake of brevity, not described hereunder.

The aforesaid seamless connection precludes any air-penetrable passages otherwise formed between two connected walls or panels, when the two walls or panels are integrally formed or connected by a conventional means of connection, such as bolts or adhesion.

The filter gauze 21 is disposed at the casing 11 and covers the inlet 15.

The motor 31 is fixedly disposed at the casing 11 and disposed in the receiving space 182.

The whizzer blades 41 are disposed at the motor 31 and in the receiving space 182. The curved panel 19 curves to an extent corresponding in curvature to part of the outer edges of the whizzer blades 41 and is spaced apart from the whizzer blades 41 by a predetermined distance. The whizzer blades 41 axially face the through holes 181 of the two inner sidewalls 18 and are driven by the motor 31 to draw air into the air filter 10 via the through holes 181 of the two inner sidewalls 18 and then discharge air via the outlet 16. This embodiment is exemplified by two plurality of whizzer blades 41, as described below.

In this embodiment, the two inner sidewalls 18 are parallel, whereas rear segments of the two sidewalls 14 extend rearward, arcuately and toward each other so as to seamlessly connect to the two inner sidewalls 18. With the two inner sidewalls 18 being parallel, the receiving space 182 corresponds in outline to the whizzer blades 41, allowing the whizzer blades 41 to drive air efficiently. In practice, the two inner sidewalls 18 are not necessarily parallel; depending on user needs, it is desirable for the casing 11 to further have at least one other wall when the two inner sidewalls 18 are not parallel, such that the receiving space 182 corresponds in shape to the whizzer blades 41, thereby allowing the whizzer blades 41 to drive air efficiently. Since the rear segments of the two sidewalls 14 extend arcuately, the magnitude of contact and friction between the air and each sidewall 14 is minimized, thereby reducing noise. Alternatively, depending on user needs, the two sidewalls 14 do not extend arcuately; for instance, the casing 11 is a cuboid, and the two sidewalls 14 are upright.

In this embodiment, the curved panel 19 extends toward the motor 31 to form a fixing wall 191, thereby partitioning the receiving space 182 into two sub-spaces 1821. The motor 31 is fixedly disposed on the fixing wall 191. Two ends of a driving axle 32 of the motor 31 are exposed from two sides of the motor 31 and each have a plurality of whizzer blades 41. The two plurality of whizzer blades 41 are disposed in the two sub-spaces 1821, respectively. This embodiment is exemplified by two plurality of whizzer blades 41. In practice, only one plurality of whizzer blades 41 is provided as needed, and the receiving space 182 need not be partitioned into two sub-spaces 1821. The distance between the curved panel 19 and each of the outer edges of the two plurality of whizzer blades 41 increases toward the outlet 16 along the direction of rotation of the two plurality of whizzer blades 41; hence, the air being driven by the two plurality of whizzer blades 41 in operation is appropriately converged within the space between the curved panel 19 and each of the two plurality of whizzer blades 41 so as to increase the amount of air discharged, i.e., air discharging efficiency.

A guiding wall 183 is disposed around each through hole 181 of the corresponding one of the inner sidewalls 18 and extends obliquely toward the center of the through hole 181 and toward the receiving space 182. The guiding walls 183 reduce air friction and thus reduce noise when air passes through the through holes 181 in the casing 11.

Figure 1:
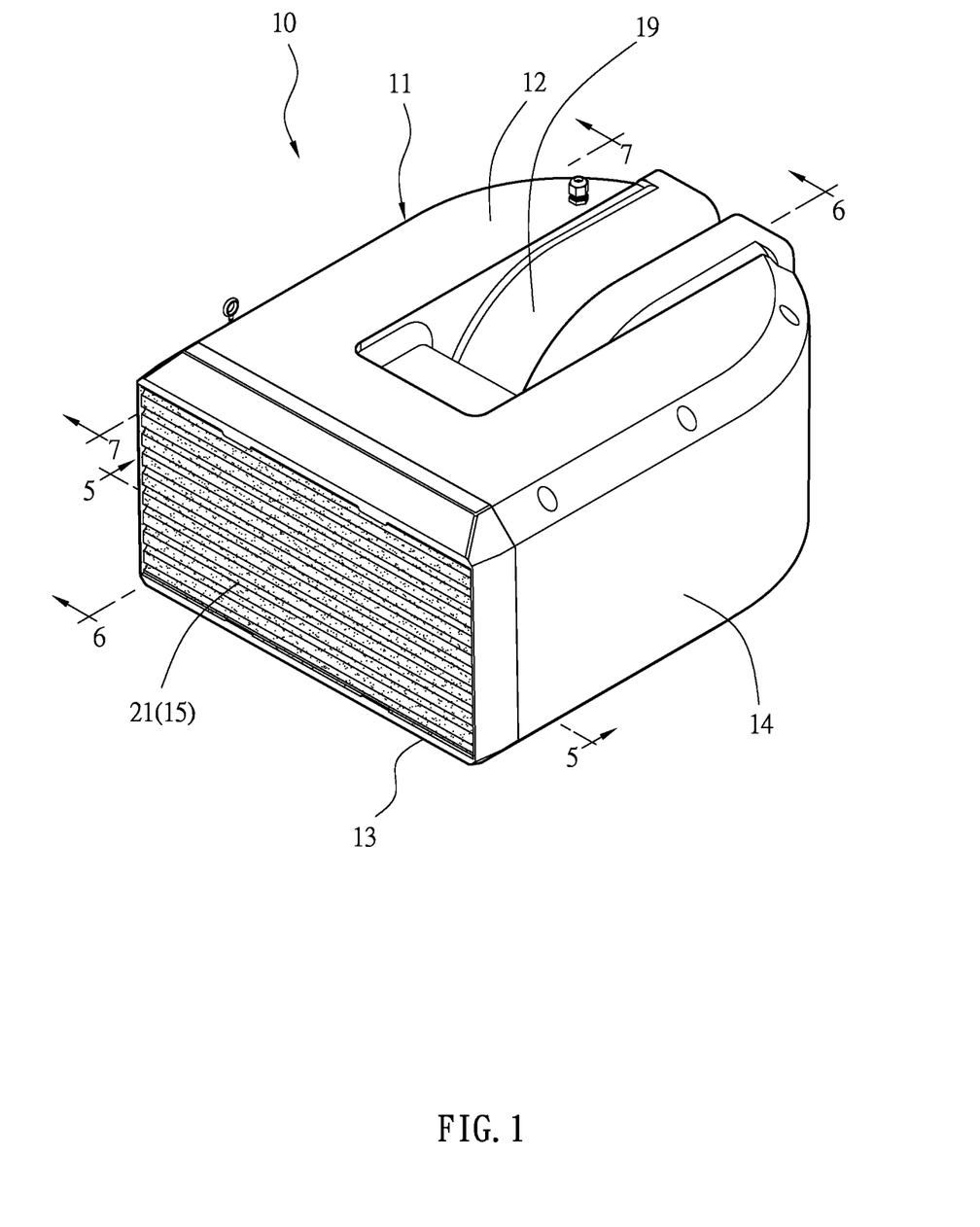
FIG. 1 is a perspective view of an air filter according to a preferred embodiment of the present disclosure.
Figure 2:
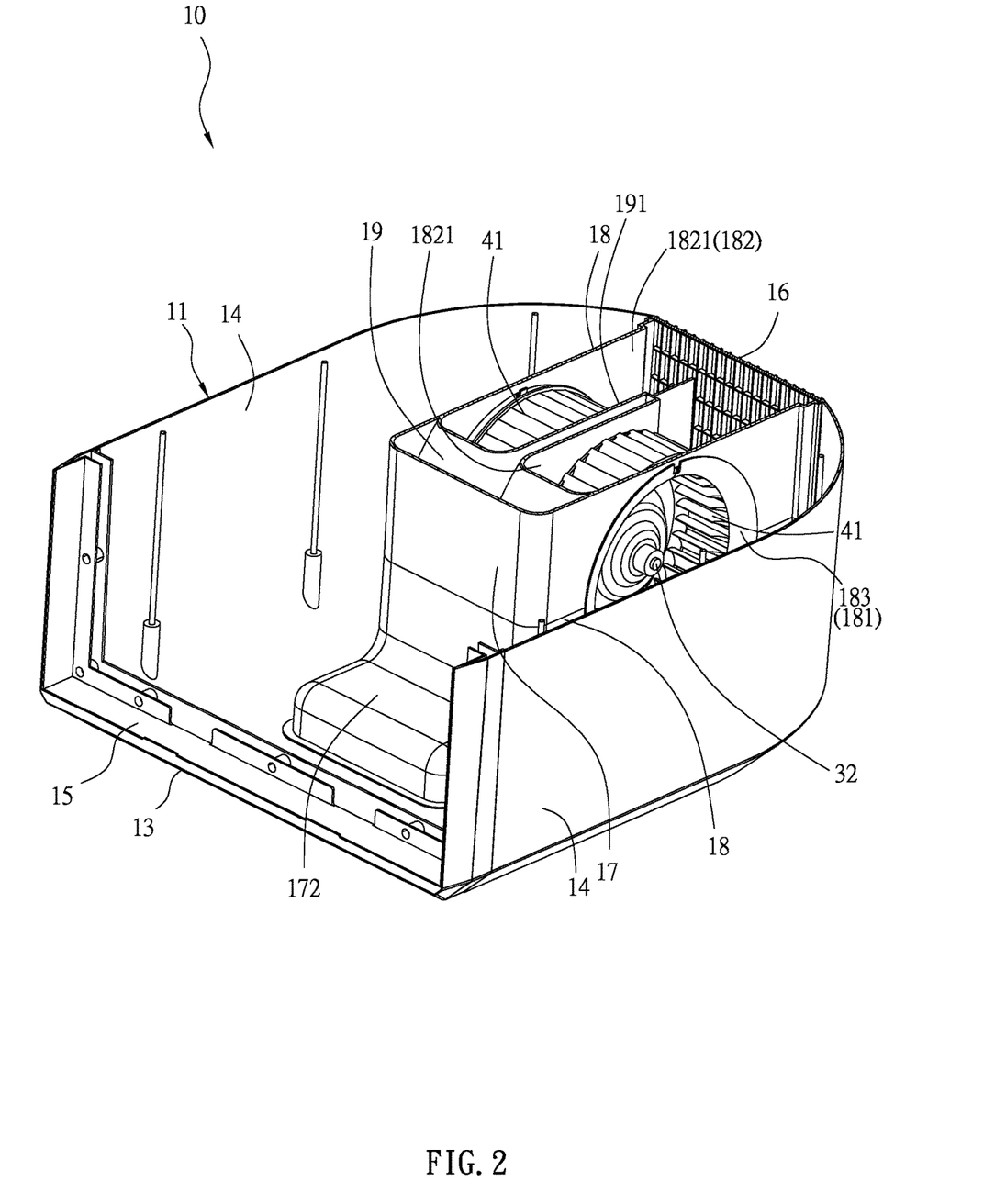
FIG. 2 is a cutaway view of the air filter according to the preferred embodiment of the present disclosure, not showing a filter gauze and top panel
Figure 3:
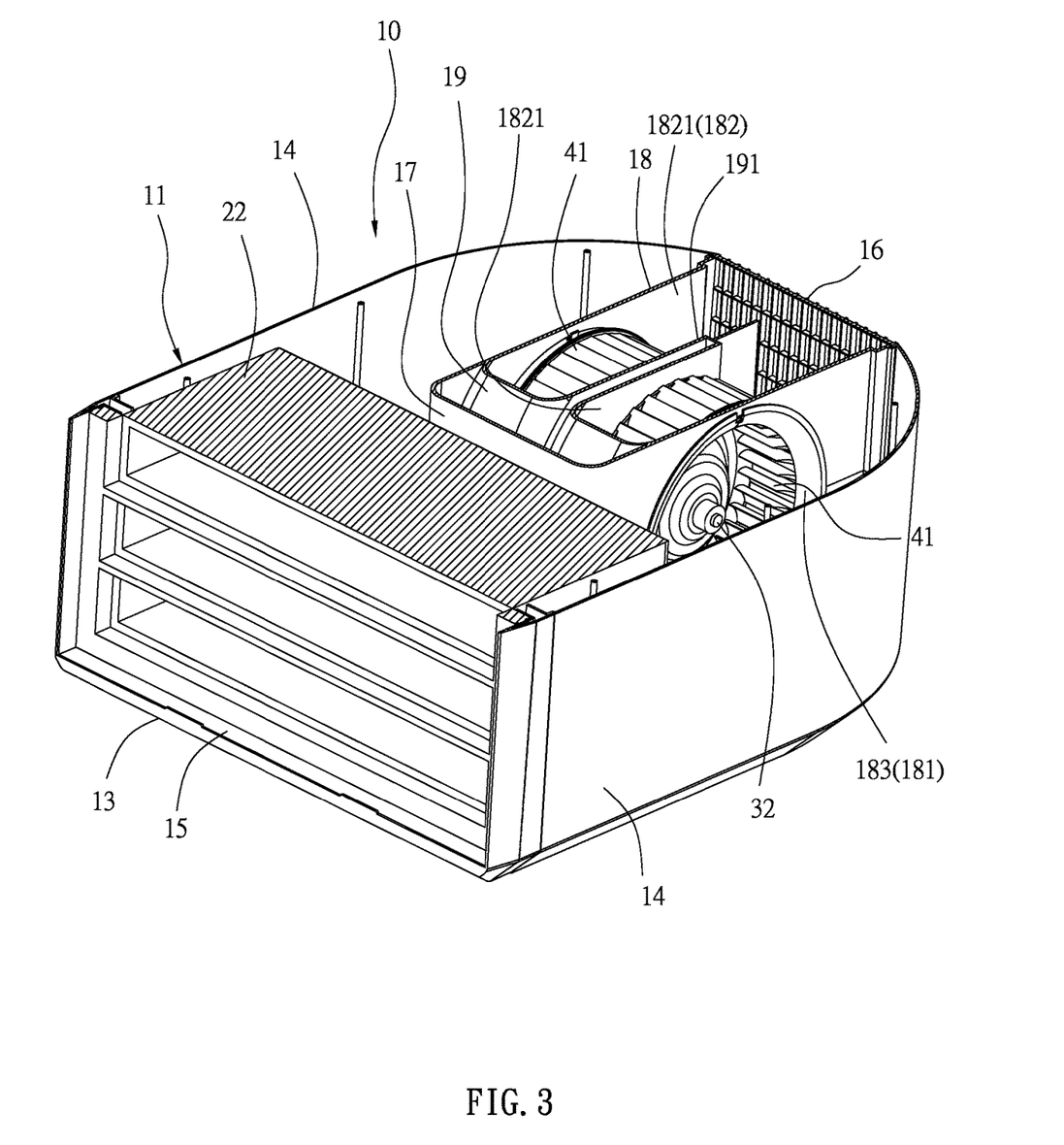
FIG. 3 is a cutaway view of the air filter according to the preferred embodiment of the present disclosure, showing a dust collector mounted in place.
Figure 4:
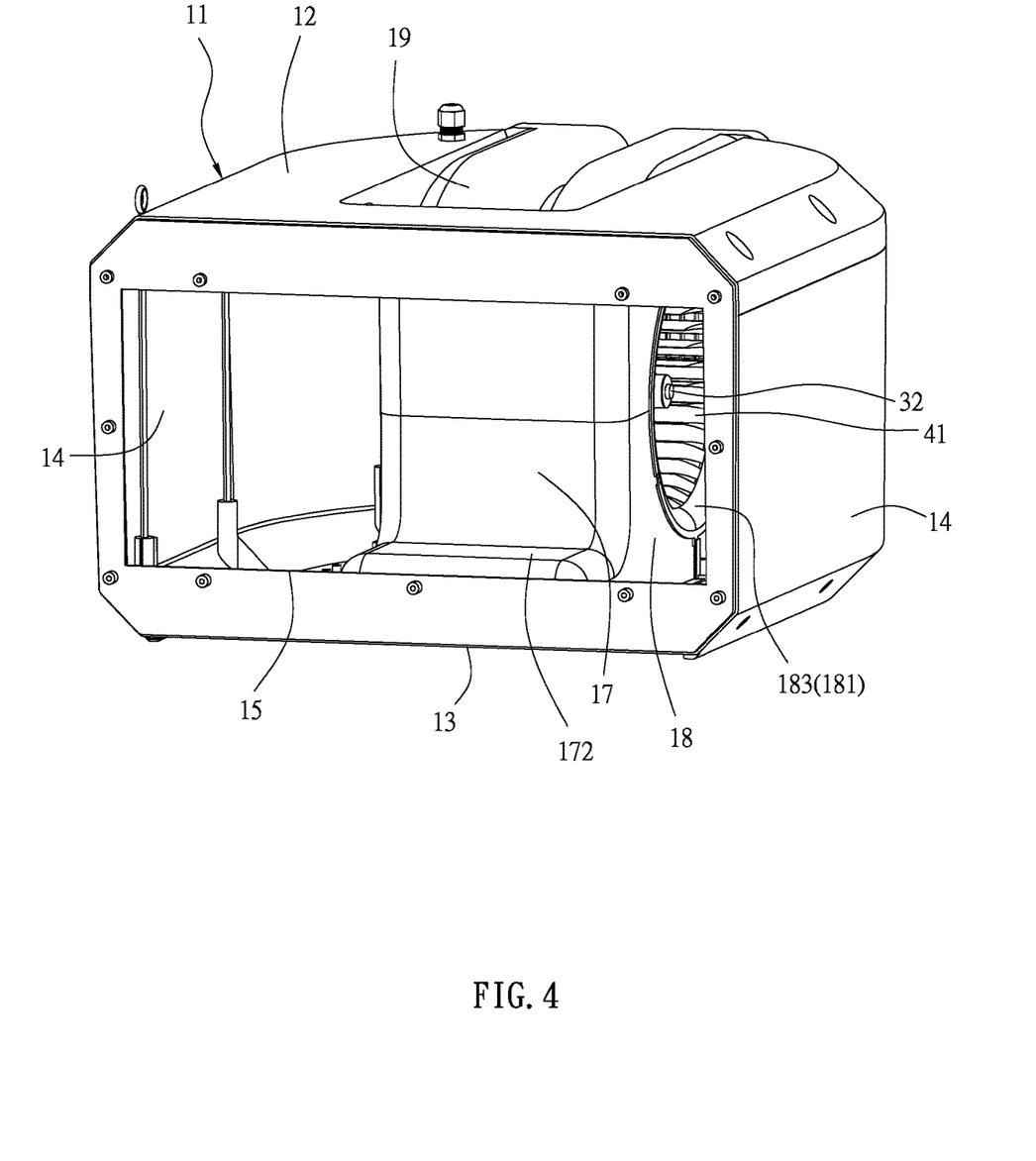
FIG. 4 is a perspective view of the air filter taken at another angle according to the preferred embodiment of the present disclosure, not showing the filter gauze.
Figure 5:
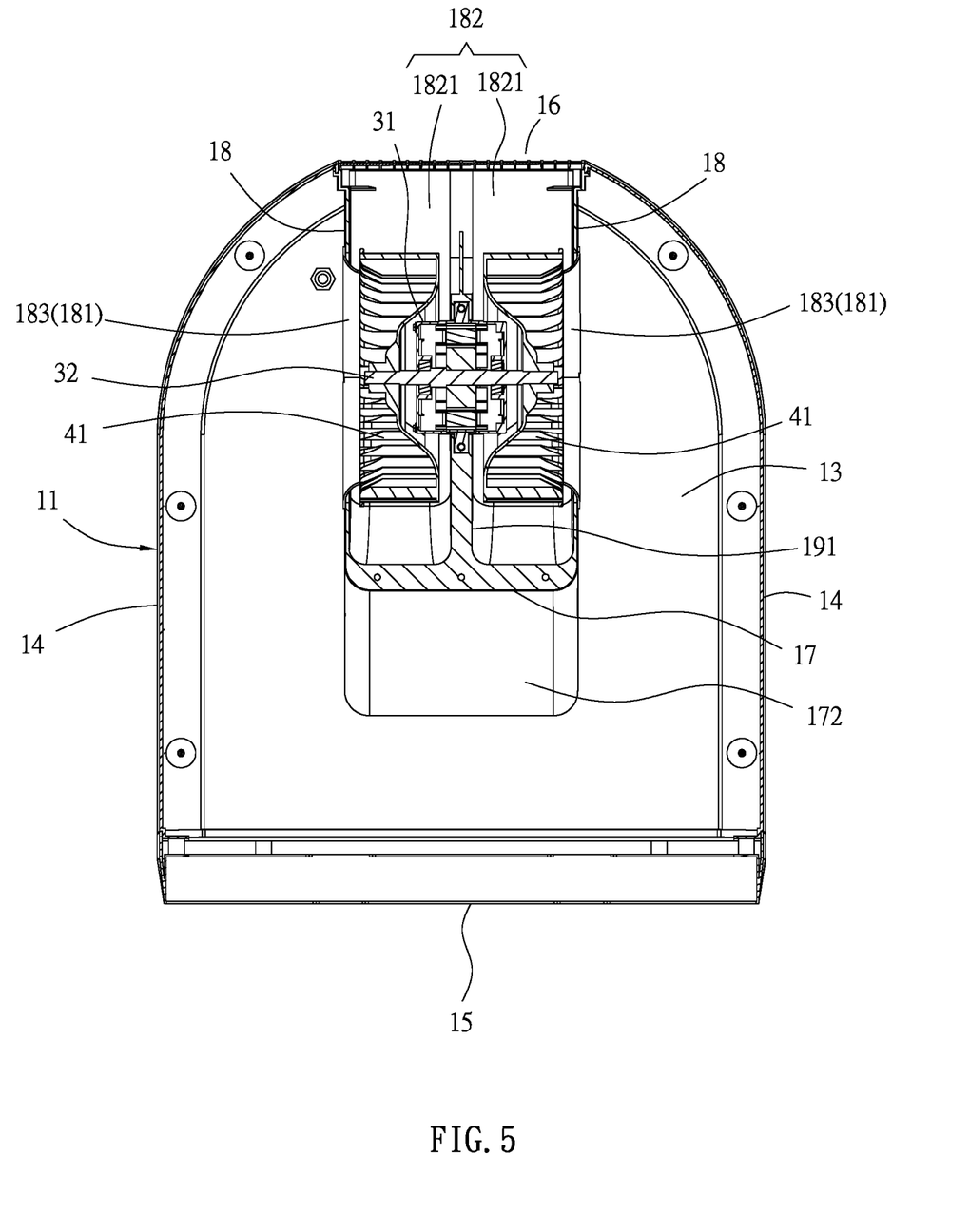
FIG. 5 is a cross-sectional view taken along line 5-5 of FIG. 1.
Figure 6:
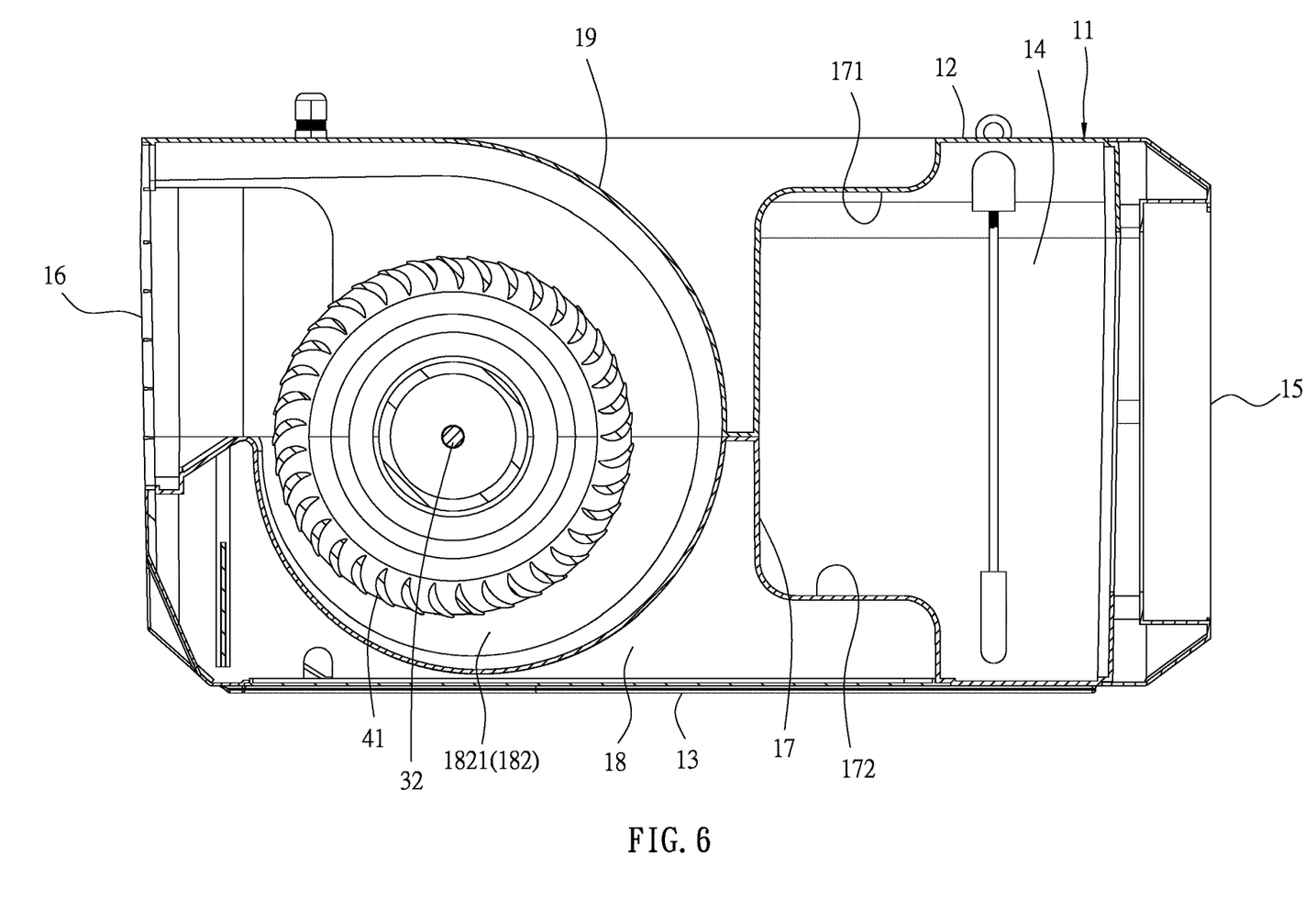
FIG. 6 is a cross-sectional view taken along line 6-6 of FIG. 1.
Figure 7:
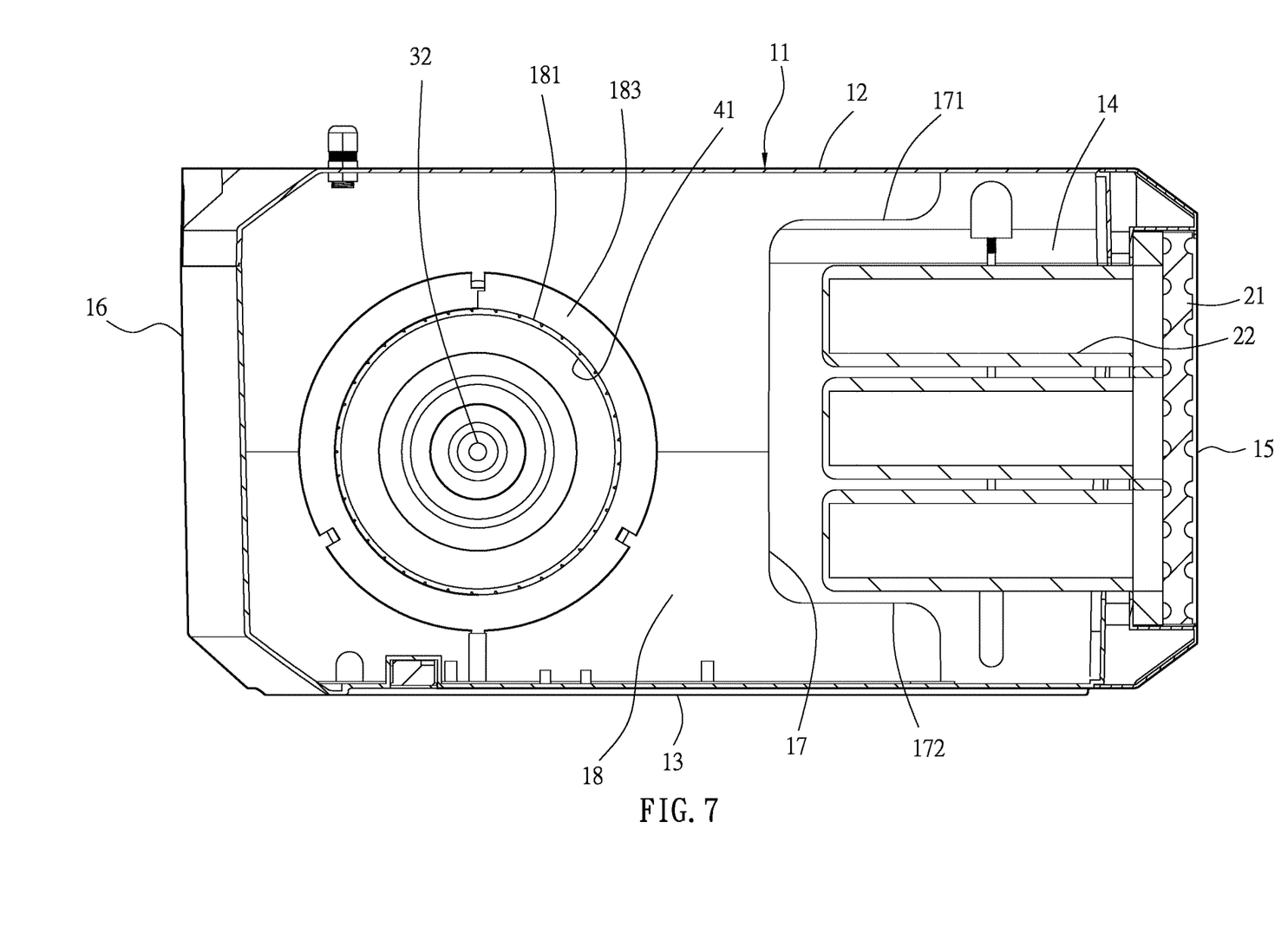
FIG. 7 is a cross-sectional view taken along line 7-7 of FIG. 1.

The top edge and bottom edge of the inner blocking wall 17 extend forward to form an upper restrictive platform 171 and a lower restrictive platform 172, respectively. The filter gauze 21 has a plurality of dust collectors 22. The space between the upper restrictive platform 171 and the lower restrictive platform 172 receives the plurality of dust collectors 22 of the filter gauze 21 and is large enough to allow for the unfolding of the plurality of dust collectors 22. The plurality of dust collectors 22 further comprise a filter gauze with fine mesh to not only collect dust but also be penetrable by air.

The structure of the air filter 10 is described above. The way of operating the air filter 10 is described below.

Referring to FIG. 1 through FIG. 7, after the motor 31 has been started to drive the rotation of the whizzer blades 41, air within the casing 11 is drawn in via the through holes 181 and discharged via the outlet 16. The air inside the casing 11 generates a negative pressure relative to the exterior, and thus external air enters the inlet to undergo filtration effected by the filter gauze 21 before being admitted to the casing 11. When the air filter 10 is installed at woodworking workplaces, the filter gauze 21 blocks wood chips and dust which might otherwise be carried by air into the casing 11 through the dust collectors 22. Thus, the air filter 10 in operation draws in external air and then discharges it, whereas the filter gauze 21 filters out the wood chips and dust which might otherwise be carried by the air.

Compared with the prior art, the present disclosure is advantageous in that the motor 31, whizzer blades 41 and filter gauze 21 are coupled together and disposed in the casing 11. Therefore, compared with its conventional counterparts, the air filter 10 is advantageously compact, structurally simple and easy to produce. Furthermore, the receiving space 182 corresponds in shape to the two plurality of whizzer blades 41 and the curved panel 19, such that the two plurality of whizzer blades 41 discharge air efficiently, thereby optimizing the efficiency of air admittance and filtration.

Figure 8:
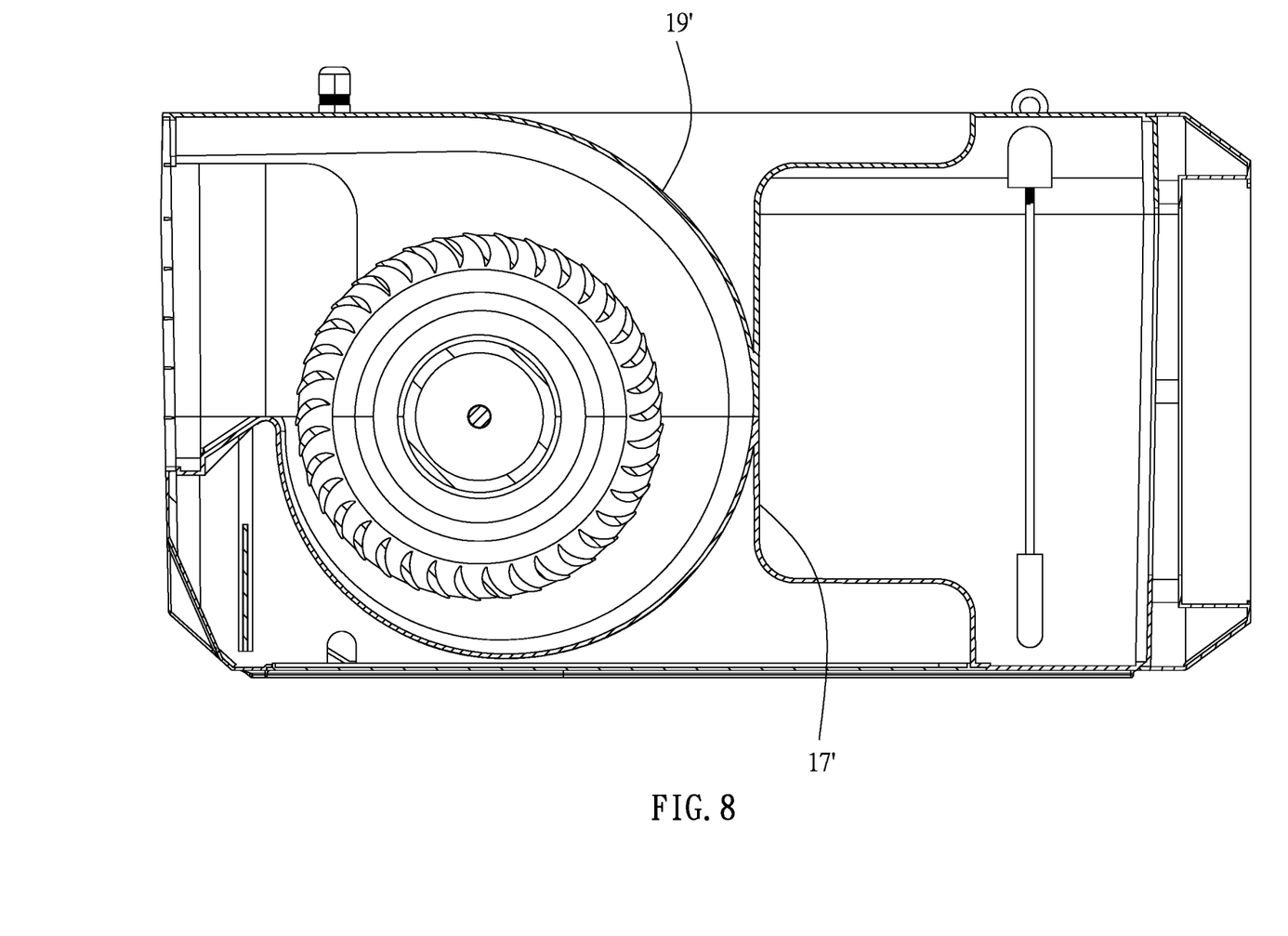
FIG. 8 is a schematic view of the air filter according to another preferred embodiment of the present disclosure, showing that a curved panel and an inner blocking wall are integrally formed.

In the aforesaid embodiment, although the curved panel 19 is spaced apart from the inner blocking wall 17 by a predetermined distance, the curved panel 19' and the inner blocking wall 17' are integrally formed and connected (and thus are not spaced apart by any distance) as shown in FIG. 8. Therefore, in the aforesaid embodiment, the curved panel 19' is not necessarily spaced apart from the inner blocking wall 17' by a predetermined distance.

What is claimed is:

1. An air filter essentially for use in woodworking workplaces, comprising:
    a casing having a top panel, a bottom panel and two sidewalls, the casing having an inlet anteriorly and an outlet, the casing having therein an inner blocking wall seamlessly connected to the top panel and the bottom panel, wherein left and right edges of the inner blocking wall extend rearward to form two inner sidewalls, respectively, wherein the two inner sidewalls are seamlessly connected to the top panel and the bottom panel, and the rear ends of the two inner sidewalls are seamlessly connected to the two sidewalls, wherein the two inner sidewalls are each penetrated by a through hole, and the two through holes face each other, wherein the through holes of the two inner sidewalls are in communication with the inlet, wherein the casing further has a curved panel bending in its thickness direction, such that its two edges seamlessly connect to the two inner sidewalls, allowing the curved panel and the two inner sidewalls to together define a receiving space, the receiving space being in communication with the outlet, the inner blocking wall being spaced apart from the inlet by a predetermined distance, wherein left and right lateral edges of the inner blocking wall are spaced apart from the two sidewalls by a predetermined distance;
    a filter gauze disposed at the casing and covering the inlet;
    a motor fixedly disposed at the casing and disposed in the receiving space; and
    a plurality of whizzer blades disposed at the motor and in the receiving space, wherein the curved panel curves to an extent corresponding in curvature to part of outer edges of the whizzer blades and is spaced apart from the whizzer blades by a predetermined distance, wherein the whizzer blades axially face the through holes of the two inner sidewalls and are driven by the motor to draw in air via the through holes of the two inner sidewalls and then discharge the air via the outlet.

2. The air filter essentially for use in woodworking workplaces according to claim 1, wherein the two inner sidewalls are parallel, and rear segments of the two sidewalls extend rearward, extend toward each other arcuately, and connect to the two inner sidewalls seamlessly.

3. The air filter essentially for use in woodworking workplaces according to claim 1, wherein the curved panel extends toward the motor to form a fixing wall and partition the receiving space into two sub-spaces, the motor being fixedly disposed on the fixing wall and having a driving axle with two ends exposed from two sides of the motor, wherein a plurality of said whizzer blades is disposed at each said end of the driving axle, allowing the two plurality of said whizzer blades to be disposed in the two sub-spaces, respectively.

4. The air filter essentially for use in woodworking workplaces according to claim 1, wherein the curved panel is spaced apart from the inner blocking wall by a predetermined distance.

5. The air filter essentially for use in woodworking workplaces according to claim 1, wherein the curved panel and the inner blocking wall are seamlessly connected.

6. The air filter essentially for use in woodworking workplaces according to claim 1, wherein a guiding wall is disposed around each said through hole of a corresponding one of the inner sidewalls and extends obliquely toward the center of the through hole and toward the receiving space.

7. The air filter essentially for use in woodworking workplaces according to claim 1, wherein a top edge and a bottom edge of the inner blocking wall extend forward to form an upper restrictive platform and a lower restrictive platform, respectively, and the filter gauze has a dust collector, wherein space between the upper restrictive platform and the lower restrictive platform receives the plurality of dust collectors of the filter gauze and is large enough to allow for unfolding the plurality of dust collectors.

8. The air filter essentially for use in woodworking workplaces according to claim 1, wherein distance between the curved panel and each of the outer edges of the two plurality of whizzer blades increases toward the outlet along the direction of rotation of the two plurality of whizzer blades.

9. The air filter essentially for use in woodworking workplaces according to claim 1, wherein the outlet is posteriorly disposed at the casing.

* * * * *